Feb. 21, 1956  J. V. FOWLER  2,735,489

QUICK-RELEASE KNOCKOUT PUNCH

Filed March 6, 1953

INVENTOR.
JESS V. FOWLER
BY George Sipkin
George E. Pearson
ATTORNEYS

United States Patent Office 2,735,489
Patented Feb. 21, 1956

2,735,489
QUICK-RELEASE KNOCKOUT PUNCH
Jess Van Fowler, San Diego, Calif.

Application March 6, 1953, Serial No. 340,937

4 Claims. (Cl. 164—101)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus for punching holes, and more specifically to a quick-release knockout punch.

It is an object of this invention to provide new and improved means to punch holes in sheet metal, in particular in chassis and other sheet metal forms which are too deep to allow punching by standard punches.

It is a further object to provide a knockout punch which may be quickly assembled and disassembled.

A still further object of the invention is to provide a time-saving tool for punching holes in sheet metal and analogous sheet material.

A further object is to provide a knockout punch which employs a quick-release nut arrangement wherein the nut cooperates with the tool to provide an effective engagement and disengagement of the nut with the remainder of the tool.

Other objects and many of the attendant advantages of this invention will be readily appreciated as the same becomes better understood by reference to the following detailed description when considered in connection with the accompanying drawings wherein.

Figure 1:
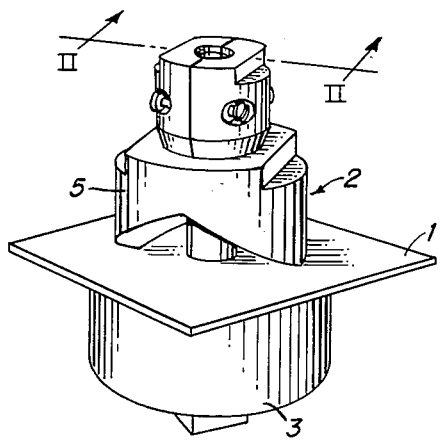
Fig. 1 is a view in perspective showing an embodiment of the invention.
Figure 2:
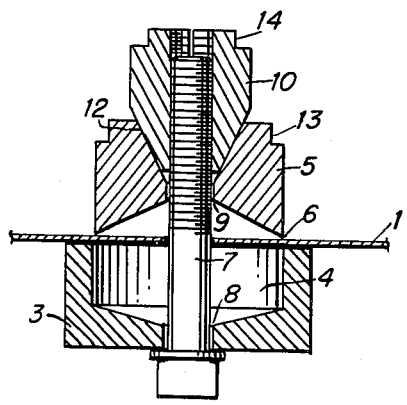
Fig. 2 is a sectional view of the embodiment shown in Fig. 1 taken along lines II—II.
Figure 3:
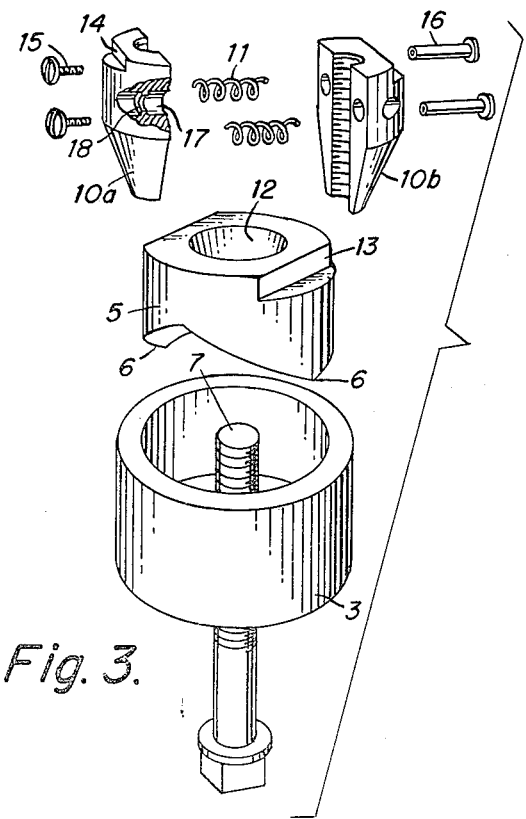
Fig. 3 is an exploded view in perspective of the embodiment shown in Fig. 1.
Figure 4:
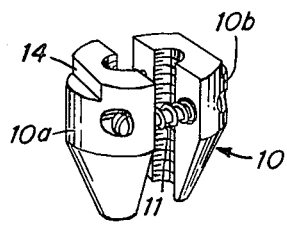
Fig. 4 is a perspective view of the assembled split nut element used in the embodiment shown in Figs. 1–3.

Referring to the drawings, 1 designates the work piece which is desired to be punched. The cutting device generally designated 2, is comprised of a female cutting member 3 having a cavity 4 with a periphery corresponding to the desired hole to be punched and a male cutting member 5 having a cutting edge 6. The work piece 1 is punched by forcing the male member 5 therethrough into the female member 3. This is accomplished by means of a bolt 7 passed through an aperture 8 in the female member 3 and through an aperture 9 in the male member 5, and releasably threaded into a split nut 10 comprised of two identical halves 10a and 10b. The split nut 10 is spring loaded as shown at 11, for the purpose of quickly releasing the nut. The springs are held in place by a pair of screws 15 and screw-threaded sleeves 16 which extend through transverse openings 17 in the split nut 10. The springs abut against stop shoulders 18 in openings 17. The male cutting member 5 is coned out to provide a cam surface as shown at 12, and the split nut 10 is correspondingly conically shaped to provide a mating cam surface which fits into the coned-out portion 12. Both the cutting member 5 and the split nut 10 are provided with flat shoulders, 13 and 14 respectively, for assuring good gripping of these members during relative movement thereof.

A hole slightly larger than the diameter of the bolt 7 is first cut, as with a drill or other known means, in the work piece 1, the bolt then being placed through the female member 3, work piece 1 and male member 5. The split nut 10 is then placed on the bolt and forced into threaded engagement therewith by the coaction of the complementary conical surfaces of the nut and the male member 5. The nut is then fed onto the bolt causing the male member to cut into work piece 1 resulting in the desired hole being punched. The slug is then discharged from the cutter and the cutter disassembled by merely pushing the male member 5 further into the large cavity 4 in the female member 3. This will release the radial pressure on the split nut 10, and the springs 11 will force the nut into disengagement with the bolt 7, thus allowing the nut 10 and male member 5 to be quickly and easily disassembled from the female member 3.

It will be seen that the threadedly interengaged nut 10 and bolt 7 apply opposed pressures to the cutting members 3, 5 by virtue of their abutment therewith. The threaded engagement is maintained by the action of the mating cam surfaces on elements 5 and 10 in response to the pressures between the cutting members and the threaded devices 7, 10. In response to release of these pressures, at the completion of the punching operation by pushing member 5 into cavity 4, springs 11 operate to effect disengagement of the nut and bolt and thereby permit rapid disassembly of the punch.

As an alternative structure the split nut may be fitted into the female member rather than the male member, with substantially the same results, although such would not be as desirable or satisfactory as the illustrated embodiment due to the requirement of considerable structural support in the female member to give it adequate structural strength.

Obviously many modifications and variations of the present invention are possible in the light of the above teachings. It is therefore to be understood that within the scope of the appended claims the invention may be practiced otherwise than as specifically described.

Having described the invention, what is claimed is:

1. A punch comprising a female member, an interfitting male cutter member, each of said members being coaxially apertured, one of said members having at least a portion of its aperture coned out, a bolt threaded at one end and headed at the other, said bolt extending through the apertures in said members with its threaded end extending outwardly through said one of the members, and a split nut, said split nut having a surface complementary to said coned out portion of the aperture in said one of the members and being releasably engageable on said bolt for progressing said male member into said female member as long as an opposing force is encountered therebetween.

2. A quick-release punch comprising a female member having a cavity therein, the periphery of which corresponds to the outline of a hole desired to be punched, a complementary male cutter member, a split nut having a conically shaped surface, a complementary coned out surface in one of said members, each of said members being apertured therethrough coaxially with said complementary coned out surface, and a threaded bolt extending through said apertures with its threaded end extending through the said one of the members, said split nut being releasably engageable with the threaded end of said bolt through coaction with said complementary coned out surface.

3. A quick-release knock-out punch comprising first and second interfitting cutting members, first and second threadedly engaged and radially separable means for respectively applying opposed pressures to said first and second members to drive said members toward each other and punch a work piece interposed therebetween, means responsive to said pressures for preventing radial separation and maintaining threaded engagement of said first and second means during the punching operation, and means responsive to the release of said pressures for radially separating said threadedly engaged means.

4. A quick-release knock-out comprising a male cutter member, a complementary female member, one of said members having a cam surface thereon, means including a split nut and a bolt releasably threaded therein for exerting pressure on said members to force said male member into said female member through a work piece interposed therebetween, said means including cam means cooperatively engaging said cam surface for releasably maintaining said nut in threaded engagement with said bolt in response to said pressure on said members.

References Cited in the file of this patent

UNITED STATES PATENTS

| Number | Name | Date |
|---|---|---|
| 351,474 | Stevens et al. | Oct. 26, 1886 |
| 642,170 | Starrett | Jan. 30, 1900 |
| 1,705,811 | Eidel | Mar. 19, 1929 |
| 1,721,007 | Doherty | July 16, 1929 |
| 1,754,568 | Nischan | Apr. 15, 1930 |
| 1,817,223 | Abramson et al. | Aug. 4, 1931 |
| 2,118,361 | Schaeffer | May 24, 1938 |
| 2,237,069 | Christenson | Apr. 1, 1941 |